No. 760,208. PATENTED MAY 17, 1904.
J. W. JACKSON.
CANE STRIPPER.
APPLICATION FILED DEC. 23, 1903.
NO MODEL.
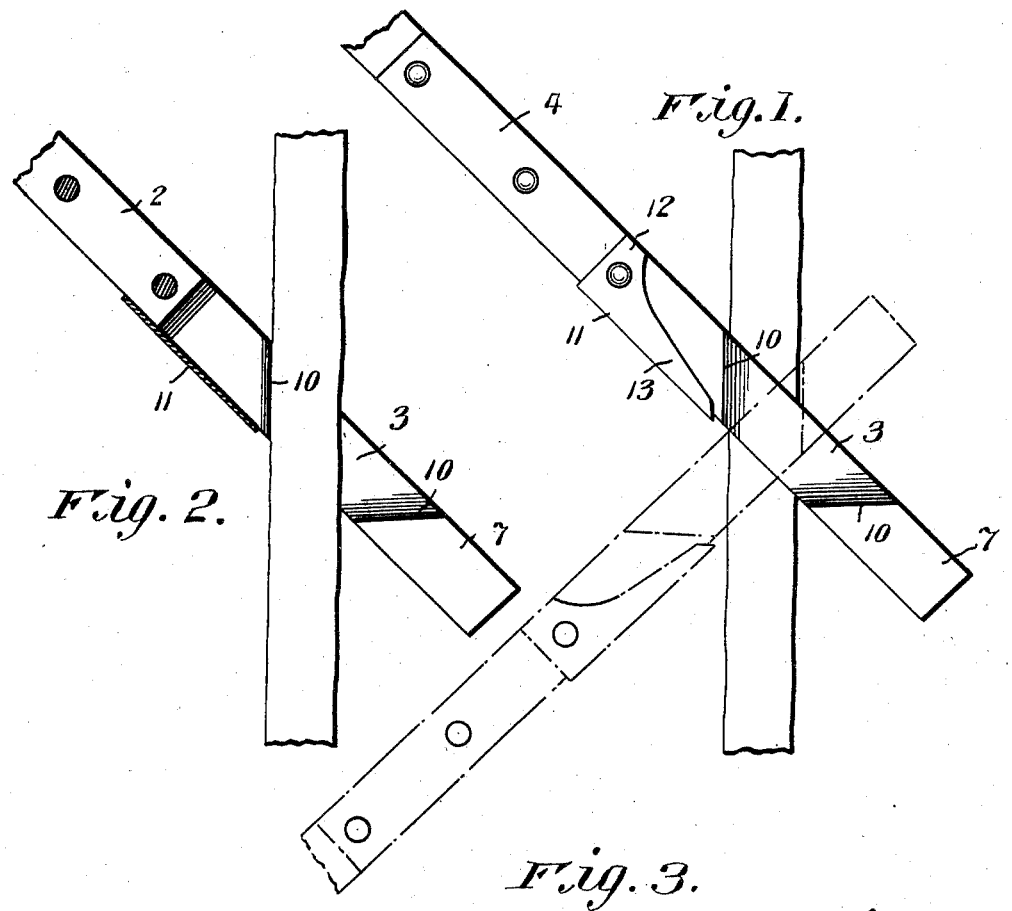
WITNESSES:
Edwin G. McKee
J. W. Riley
INVENTOR
John W. Jackson,
By Reynold M. Smith
Attorney.

No. 760,208. Patented May 17, 1904.

UNITED STATES PATENT OFFICE.

JOHN W. JACKSON, OF CAIRO, GEORGIA, ASSIGNOR TO WILLIAM A. MORGAN, OF EASTMAN, GEORGIA.

CANE-STRIPPER.

SPECIFICATION forming part of Letters Patent No. 760,208, dated May 17, 1904.

Application filed December 23, 1903. Serial No. 186,403. (No model.)

*To all whom it may concern:*

Be it known that I, JOHN W. JACKSON, a citizen of the United States, residing at Cairo, in the county of Thomas and State of Georgia, have invented a certain new and useful Cane-Stripper, of which the following is a specification, reference being had therein to the accompanying drawings.

This invention relates to cane-strippers, the object in view being to provide a manually-operated cane-stripper which may be operated at a great variety of angles with relation to the cane or stalk and which under any of the various angles will effectively strip the fodder or blades from the body of the cane.

With the construction of the hand-operated strippers now in use it is necessary to hold the handle of the stripper exactly at right angles to the stalk in order to strip off the blades and such handle must be held in a position perpendicular to the stalk no matter whether the stalk is standing upright or at an angle or whether the same is crooked or straight, a slight variation from the perpendicular resulting in the stripper slipping off the stalk and having to be replaced thereon. This renders the manipulation of such stripper very laborious requiring the same to be raised above the head as high as the hands will reach and pushed downward close to the ground, thereby necessitating the stooping of the operator, which becomes extremely tiresome.

The object of the present invention is to provide a construction of hand-operated cane-stripper which will enable the operator to hold the handle of the device at an angle of forty-five degrees either upward or downward, thus giving a range of ninety degrees or a right angle between the limits of pitch of the handle, which enables the device to be manipulated without the laborer having to reach upward to any considerable extent or bend his body downward in order to strip the cane close to the ground. It also enables the cane to be properly stripped when not standing upright, as in the case where the cane has been blown down, or partially so, to an inclined position.

A further object of the invention is to provide a combined guard and stop which is so combined with the blades and their shanks as to prevent fodder and other material from becoming wedged between the blades, so as to prevent the proper and efficient working of the blades and their ability to adjust themselves properly and snugly to the cane as the stripper is moved lengthwise thereof.

With the above and other objects in view, the nature of which will more fully appear as the description proceeds, the invention consists in the novel construction, combination, and arrangement of parts, as hereinafter fully described, illustrated, and claimed.

In the accompanying drawings, Figure 1 is a side elevation of the cane-stripper of this invention, showing the operation of the same in connection with the stalk and indicating some of the angles to which the stripper may be adjusted with respect to the stalk. Fig. 2 is a central longitudinal section through the same. Fig. 3 is a plan view of the stripper. Fig. 4 is a top perspective view of the same, taken about in line with the cane or stalk in order to better illustrate the manner in which the stripper adjusts itself to the cane.

Referring to the drawings, 1 designates the handle of the stripper, which may be of wood or any suitable material and the end of which next to the stripper proper is made tapering or provided with flat converging sides 2.

The stripper-blades 3 are formed of spring metal, preferably steel, and are provided with shanks 4, which extend backward along opposite sides of the handle 1 and are riveted or otherwise secured firmly thereto. At a suitable point beyond the extremity of the handle 1, the blades are offset outwardly in opposite directions, as shown at 5, to form a stripping-throat 6, and beyond said throat the extremities of the blades are extended obliquely outward in opposite directions to form flared ends 7, which comprise between them a splayed entrance-throat 8, which adapts the device to be readily placed upon the cane or stalk to be stripped.

The spring stripping-blades 3 are so offset in opposite directions that while the side portions 9 of the walls of the stripping-throat are substantially parallel to each other in all directions the end portions 10 of the walls of the throat converge transversely of the blades, thereby forming what may be termed a "tapering" stripping-throat.

By reference to the drawings it will be noted that the inclined walls at one end of the stripping-throat are substantially at right angles or at an angle of ninety degrees to the corresponding portions of the walls at the opposite ends of the throat. This arrangement adapts the device to be used at a variety of angles, as illustrated in Fig. 1, in which it will be seen that the handle may be inclined either in an upward or downward direction, and it will of course be understood that the handle, and consequently the stripping-blades, may be held and operated at any intermediate angle.

11 designates a combined guard and stop, the same being formed out of a metal blank, which is bent up to provide a sleeve or cuff portion 12, which may partially or wholly embrace the handle 1 and the shanks 4 of the stripping-blades, the said combined guard and stop being riveted or otherwise secured to the handle and blades. The body portion of the guard extends along one side of the handle and blades, as best shown in Figs. 1 and 2, to a point near the smaller end of the stripping-throat 6, the said guard terminating just short of the entrance-throat, so as to form no obstruction while the side portions of the guard are flanged, as shown at 13, to lie on opposite sides of the stripping-blades, and thereby form stops which limit the lateral outward movement of the stripping-blades, the object being to prevent the blades from being bent so far outward as to lose their elasticity and ability to fit snugly to and around the cane or stalk, it being understood that the stripping-blades must accommodate themselves snugly to the cane in order to be effective in the stripping operation.

From the foregoing description, taken in connection with the accompanying drawings, it will be understood that the stripper will operate effectively to strip the fodder from the cane no matter at what angle the handle of the device may be held with respect to the cane, thereby enabling the operator to strip the entire length of the stalk without having to reach upward to an uncomfortable extent or stoop when operating close to the ground. The spring-blades adjust themselves snugly to the cane or stalk under any angle which the stripper may assume, whether the latter be inclined upward or downward or extend at right angles to the cane. It will also be seen that the combined guard or fender and stop prevents the choking of the stripper by excluding fodder and other material from the space between the stripping-blades and also limits the outward movement of the stripping-blades, so as to prevent the same from being bent and injured. The stripper is first placed around the stalk or cane at a high point and pulled gradually downward, stripping everything from the stalk until it comes to a horizontal position, and as soon as it passes the horizontal the stripper is pushed downward against the stalk, which cleans the cane of all fodder or blades down to the root, this being accomplished without the stripper becoming caught or hung in the other stalks. On this account the improved stripper hereinabove described will enable the operator to perform more work within a given time than the ordinary strippers at present in use and with less fatigue on the part of the operator.

Having thus described the invention, what I claim as new is—

1. A hand-operated cane-stripper embodying yielding stripping-blades, oppositely offset in such manner as to form a stripping-throat substantially round at one edge of the blade and elliptical at the opposite edge.

2. A hand-operated stripper embodying yielding stripping-blades oppositely offset in such manner as to form an oblong stripping-throat, the sides of which are substantially parallel and the end walls of which slant in opposite directions.

In testimony whereof I affix my signature in presence of two witnesses.

JOHN W. JACKSON.

Witnesses:
J. M. BOHANNON,
PARK HARPER.